(12) United States Patent
Jones et al.

(10) Patent No.: US 12,220,070 B2
(45) Date of Patent: Feb. 11, 2025

(54) PRESERVATION SYSTEM FOR PERISHABLE PRODUCTS

(71) Applicant: Corrigan Corporation of America, Gurnee, IL (US)

(72) Inventors: Paul Jones, Ingleside, IL (US); Christian Trujillo, Hainsville, IL (US); Emily C. Stavrou, Grayslake, IL (US); Eric Ellingson, Libertyville, IL (US)

(73) Assignee: Corrigan Corporation of America, Gurnee, IL (US)

( * ) Notice: Subject to any disclaimer, the term of this patent is extended or adjusted under 35 U.S.C. 154(b) by 0 days.

(21) Appl. No.: 17/888,685

(22) Filed: Aug. 16, 2022

(65) Prior Publication Data

US 2024/0057792 A1 Feb. 22, 2024

(51) Int. Cl.
A47F 7/00 (2006.01)
A47F 3/04 (2006.01)

(52) U.S. Cl.
CPC .......... *A47F 7/0071* (2013.01); *A47F 3/0495* (2013.01)

(58) Field of Classification Search
CPC ...... A47F 3/001; A47F 7/0071; A47F 3/0478; A47F 3/04; A47F 3/14; A47F 5/0018; A47F 3/007; A47F 3/0495
See application file for complete search history.

(56) References Cited

U.S. PATENT DOCUMENTS 1,827,530 A 10/1931 Le Grand
RE33,067 E * 9/1989 Corrigan ............... A47F 3/0443
62/231
6,003,326 A 12/1999 Hensley
6,066,348 A 5/2000 Yuan et al.
7,258,882 B2 8/2007 Hankinson et al.
(Continued)

FOREIGN PATENT DOCUMENTS

JP 10-225507 A 8/1998
KR 100568949 B1 * 4/2006 ............. A61L 2/088
(Continued)

OTHER PUBLICATIONS

KR 100568949 B1 Translation (Year: 2006).*
WO 2009053579 A2 Translation (Year: 2009).*

*Primary Examiner* — Elizabeth J Martin
*Assistant Examiner* — Dario Antonio Deleon
(74) *Attorney, Agent, or Firm* — Wood, Phillips, Katz, Clark & Mortimer (57) ABSTRACT

As disclosed herein, a preservation system for perishable products in a display case comprises a control valve for connection to a water supply. A pressure regulator is connected to the control valve for reducing water pressure. A plurality of piezoelectric transducer nebulizers are operatively mounted to the display case in spaced apart relation to one another and are fluidically connected in series with an output of the pressure regulator to emit a dry fog. A control system comprises a controller for controlling a duty cycle of a pulse signal to vibrate the piezoelectric transducers in the plurality of nebulizers, and a timer for alternately generating an on and an off signal to periodically control the valve to supply water to the pressure regulator and to enable the controller whereby the nebulizers emit the dry fog to maintain desired relative humidity level throughout the display case.

20 Claims, 6 Drawing Sheets

(56) References Cited

U.S. PATENT DOCUMENTS

| | | |
|---|---|---|
| 7,263,843 B1 | 9/2007 | Nordstrom |
| 7,780,909 B2 | 8/2010 | Sparks |
| 7,810,742 B2 | 10/2010 | Levi |
| 8,272,582 B2 | 9/2012 | Gillette |
| 9,533,323 B2 | 1/2017 | Sauzade |
| 9,744,256 B2 | 8/2017 | Gschwind et al. |
| 10,562,060 B2 | 2/2020 | Gschwind et al. |
| 10,898,604 B2 | 1/2021 | Benedek et al. |
| 10,980,360 B2 | 4/2021 | Gschwind et al. |
| 2013/0259989 A1 | 10/2013 | Nakamura |
| 2015/0230625 A1 | 8/2015 | Gschwind et al. |
| 2016/0235219 A1* | 8/2016 | Mayer et al. ......... A47F 3/0495 |
| 2019/0120510 A1* | 4/2019 | Kleinberger et al. ... A47F 3/001 |

FOREIGN PATENT DOCUMENTS

| | | | | |
|---|---|---|---|---|
| WO | WO 9403762 A1 * | 2/1994 | ........... | A47F 3/0495 |
| WO | WO 2009053579 A2 * | 4/2009 | ........... | A47F 7/0071 |

\* cited by examiner

PRESERVATION SYSTEM FOR PERISHABLE PRODUCTS

FIELD

This application relates to preservation systems for perishable products and, more particularly, to a preservation system including a plurality of piezoelectric transducer atomizer nozzles without use of a water reservoir.

BACKGROUND

Humidification systems have found widespread use for grocery service display cases or the like to provide a water vapor that surrounds the displayed product and prevents dehydration, thus extending shelf life and preserving freshness. Such humidification systems typically include an air atomizing nozzle, compressed air and a water supply. A control selectively supplies pressurized water from the water supply and pressurized air from the compressor to the air atomizing nozzle to provide a very small droplet sized mist.

In one conventional form of produce preservation, a misting spray system includes a spray head mounted in proximity to produce to be sprayed with water mist therefrom. It is typical to provide a cabinet having a forwardly cantilevered upper portion to which the spray head is mounted. Water lines are brought up in the cabinet and connected to the spray head for controlled distribution of mist therefrom onto the produce.

While conventional misting or humidification systems address problems of dehydration of produce, seafood, poultry, meat and the like, sanitation and other problems may still exist. For example, systems emit a mist which is sometimes perceived as too wet.

Other preservation systems use an ultrasonic fog generator. Such systems use a nebulizer located in a reservoir of liquid. Water bath reservoirs with ultrasonics are a breeding ground for bacteria e.g., *Legionella*, so is advantageous to avoid having a reservoir.

The present invention is directed to solving the above problems in a novel and simple manner.

SUMMARY OF THE INVENTION

In accordance with the invention, a preservation system includes a plurality of piezoelectric transducer atomizer nozzles without use of a water reservoir.

In accordance with one aspect a preservation system for perishable products in a display case comprises a control valve for connection to a pressurized water supply. A pressure regulator is connected to the control valve for reducing water pressure in a range of 0.5-2 psi. A plurality of piezoelectric transducer nebulizers are operatively mounted in a product zone of the display case in spaced apart relation to one another and are fluidically connected in series with an output of the pressure regulator to emit a dry fog in the display case. A control system comprises a controller for controlling a duty cycle of a pulse signal to vibrate the piezoelectric transducers in the plurality of nebulizers, and a timer for alternately generating an on signal and an off signal to periodically control the valve to supply water to the pressure regulator and to enable the controller whereby the nebulizers emit the dry fog to maintain desired relative humidity level throughout the display case.

It is a feature that the pressure regulator connected to the control valve reduces water pressure in a range of 1-1.5 psi.

It is another feature that the plurality of nebulizers comprises up to eight nebulizers. The nebulizers may be spaced about one foot apart in the display case.

It is a further feature that the display case may comprises a produce case, a meat or seafood service case, or a cheese display case.

It is an additional feature that the preservation system comprises an ozone generating system operatively mounted to the display case.

It is a feature that the controller controls the piezoelectric transducers to operate at 100% duty cycle.

It is a feature that the controller is configured to control the nebulizers to emit particles in the 0.1 to 10 micron range to maintain desired relative humidity level throughout the display case.

There is disclosed in accordance with another aspect a preservation system for emitting a dry fog to preserve perishable products in a display case comprising a control device selectively actuated to provide a pressurized water supply. A pressure regulator is connected to the control device for reducing water pressure to a range of 0.5-2 psi. A plurality of piezoelectric transducer atomizer nozzles are operatively mounted in spaced apart relationship in the display case and are fluidically connected in series with an output of the pressure regulator to emit a dry fog in the display case. A control system comprises a controller for controlling a duty cycle of a pulse signal to vibrate the piezoelectric transducers in the plurality of atomizer nozzles, and a timer for alternately generating an on signal and an off signal to periodically control the control device to supply water to the pressure regulator and to enable the controller whereby the atomizer nozzles emit the dry fog to maintain desired relative humidity level throughout the display case.

Further features and advantages will be readily apparent from the description and the drawings.

DETAILED DESCRIPTION

Described herein is an exemplary preservation system to preserve perishable products in a display case. The display case is typically refrigerated. However, the preservation system may also be used in non-refrigerated applications. Such perishable products may include, for example, produce, meat, seafood, or cheese. The preservation system emits a fine fog that is non-wetting, i.e., a dry fog. The dry fog advantageously holds approximately 75% relative humidity (RH) to 99.9% RH level throughout the display produce case. These levels are excellent for minimizing produce shrink rates. The invention is illustrated and described in connection with an exemplary produce display case. As will be apparent, the configuration of the display case does not form part of the invention.

The dry fog is generated using a set of piezoelectric transducer or ultrasonic atomizer nozzles, such as nebulizers, mounted within the produce case. This piezoelectrical transducer set can emit the dry fog without any water bath reservoir.

Dry fog can be a subjective term as it is dependent on the ambient conditions. To humidify spaces, filtered water is fractionated into various water particles sizes. Conventional misting systems typically have particle sizes of approximately 10 to 90 microns. This is a light mist that results in condensation/water droplets forming on items it contacts. A dry fog is a particle small enough to evaporate in the environment before it hits any surface. These systems operate in very humid conditions, so a dry fog is considered to be particles in the 0.1 to 10 micron range. Particles sizes in this range feel very dry to the hand.

The preservation system may be equipped with an ozone sanitization system to clean throughout the produce case, dry fog equipment, and produce. It does so by providing significant log reductions in bacteria, virus, fungus and mold counts.

Referring initially to FIGS. 1-4, a display case, such as a conventional refrigerated produce case 10 includes a base 12 connected to a relatively short upstanding front wall 14 and a taller upstanding rear wall 16. A bottom shelf 18 is disposed between the front wall 14 and the rear wall 16 to define a lower produce space 20. A shelf 22 extends forwardly from the rear wall 16 above the bottom wall 18 to define an upper storage space 24. A top 26 extends forwardly atop the rear wall 16 above the shelf 22.

The lower storage space 20 and the upper storage space 24 are used to store produce or the like, such as fruits and vegetables. The invention comprehends providing for use with a product zone of such a produce case 10 a preservation system generally designated 28 adapted to selectively emit a fine, non-wetting dry fog downwardly into the storage spaces 20 and 24.

The preservation system 28 may be connected to a pressurized water supply via a tube 30. The supply may be a conventional municipal water supply. The tube 30 is connected through a control device such as a control valve 32 to a pressure regulator 34 via a tube 36, see also FIG. 2.

Figure 1:
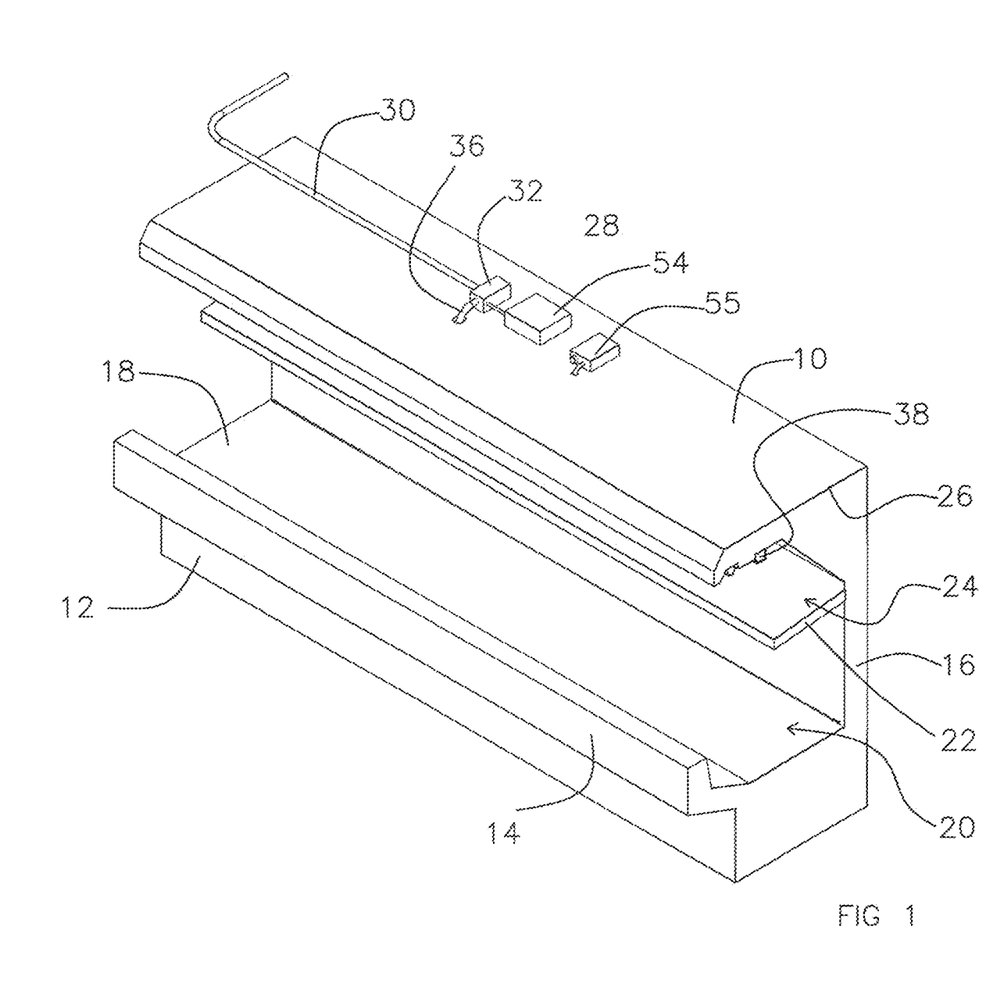
FIG. 1 is a perspective view of a display case for perishable products including a preservation system in accordance with the invention.
Figure 2:
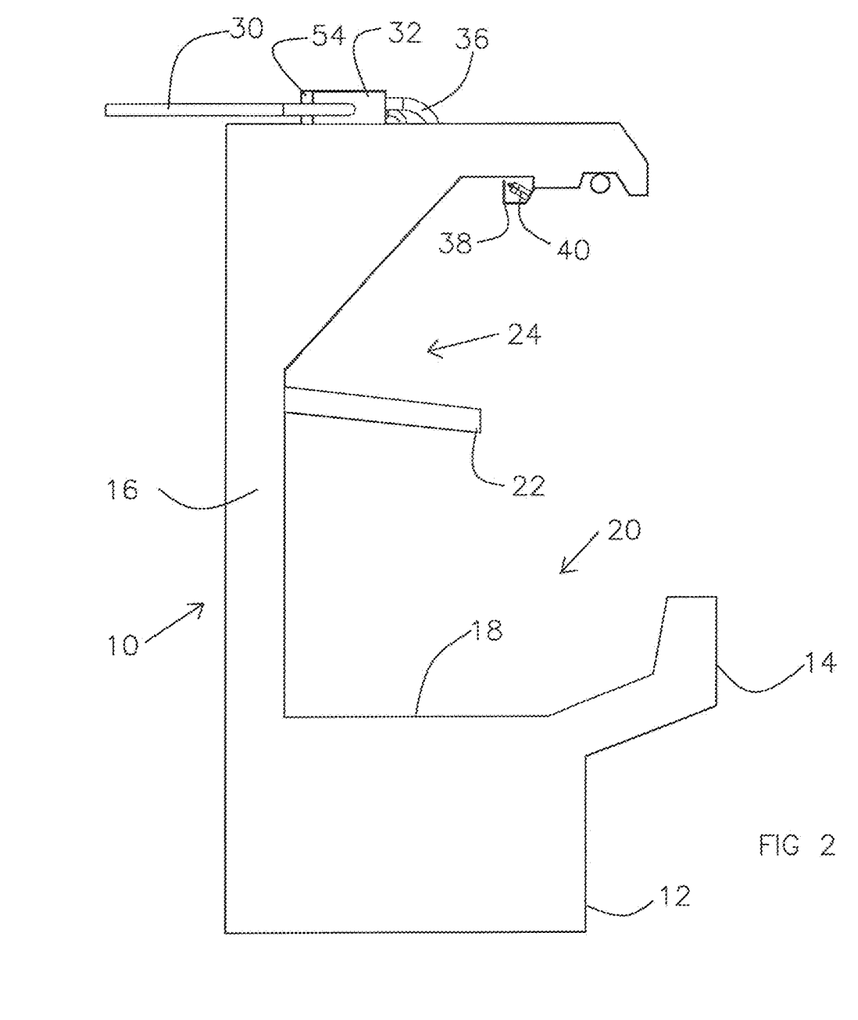
FIG. 2 is a side view of the display case of FIG. 1.
Figure 3:
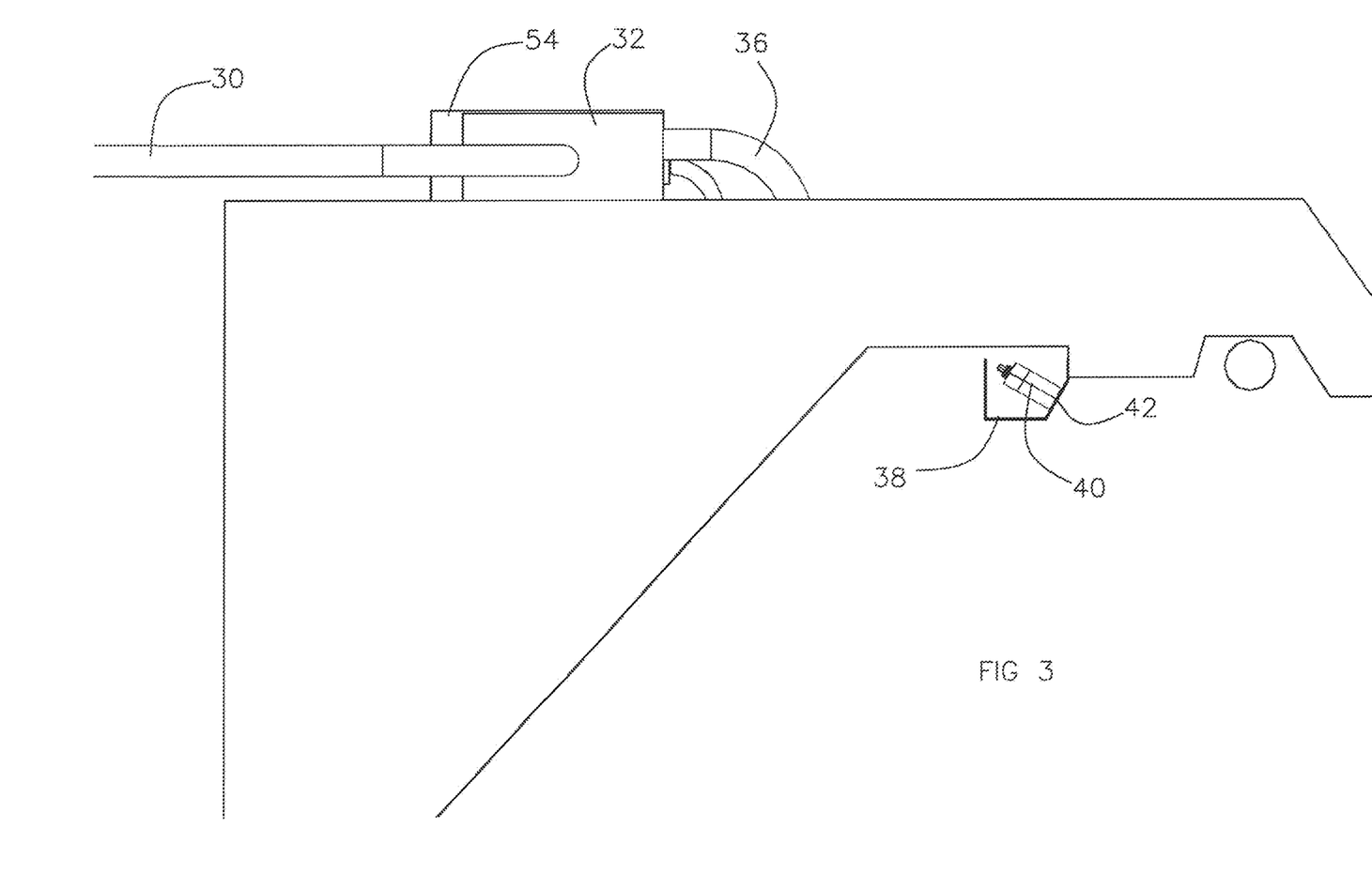
FIG. 3 is a partial side view of a top portion of the display case of FIG. 1.
Figure 4:
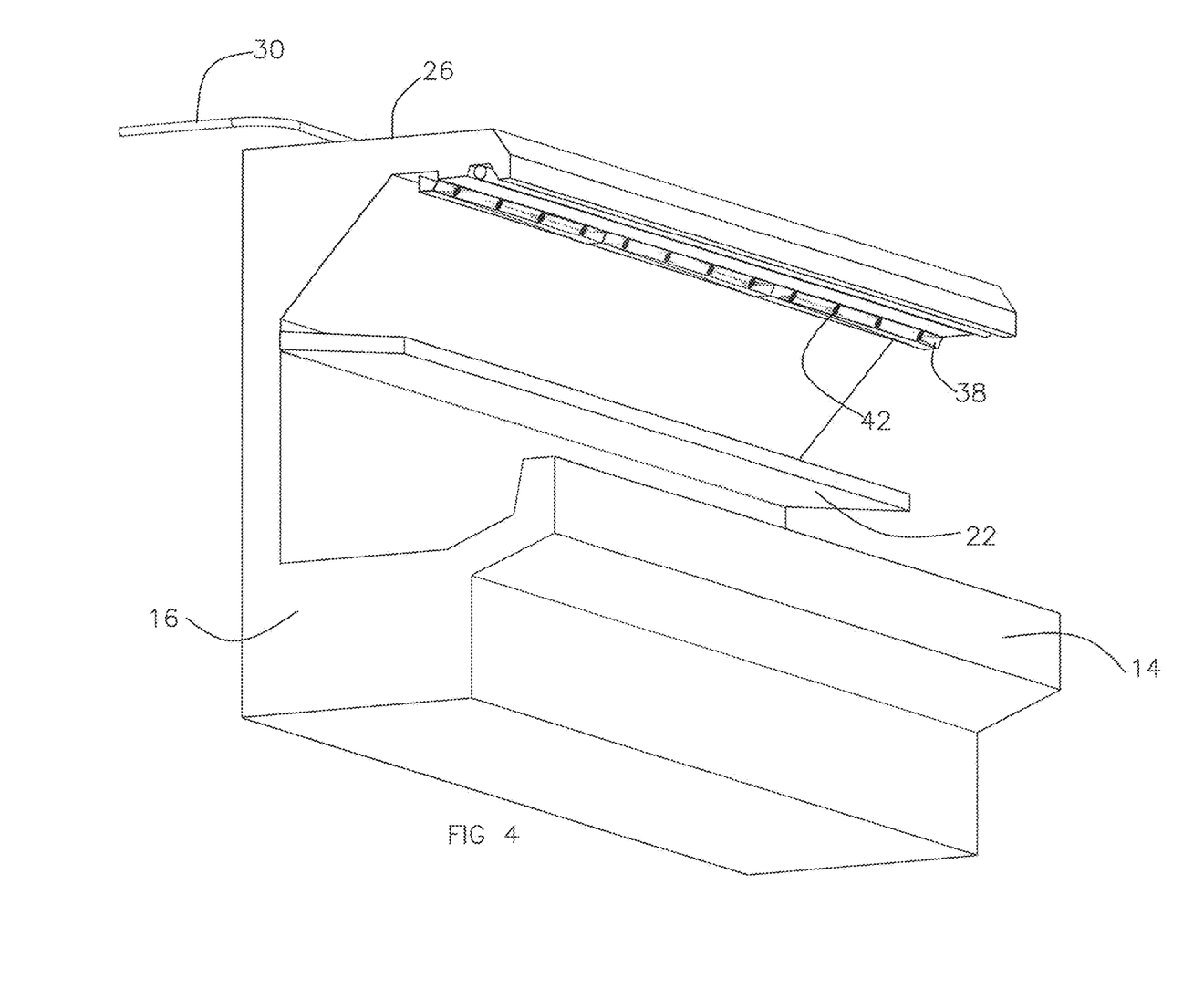
FIG. 4 is a bottom perspective view of the display case of FIG. 1.
Figure 5:
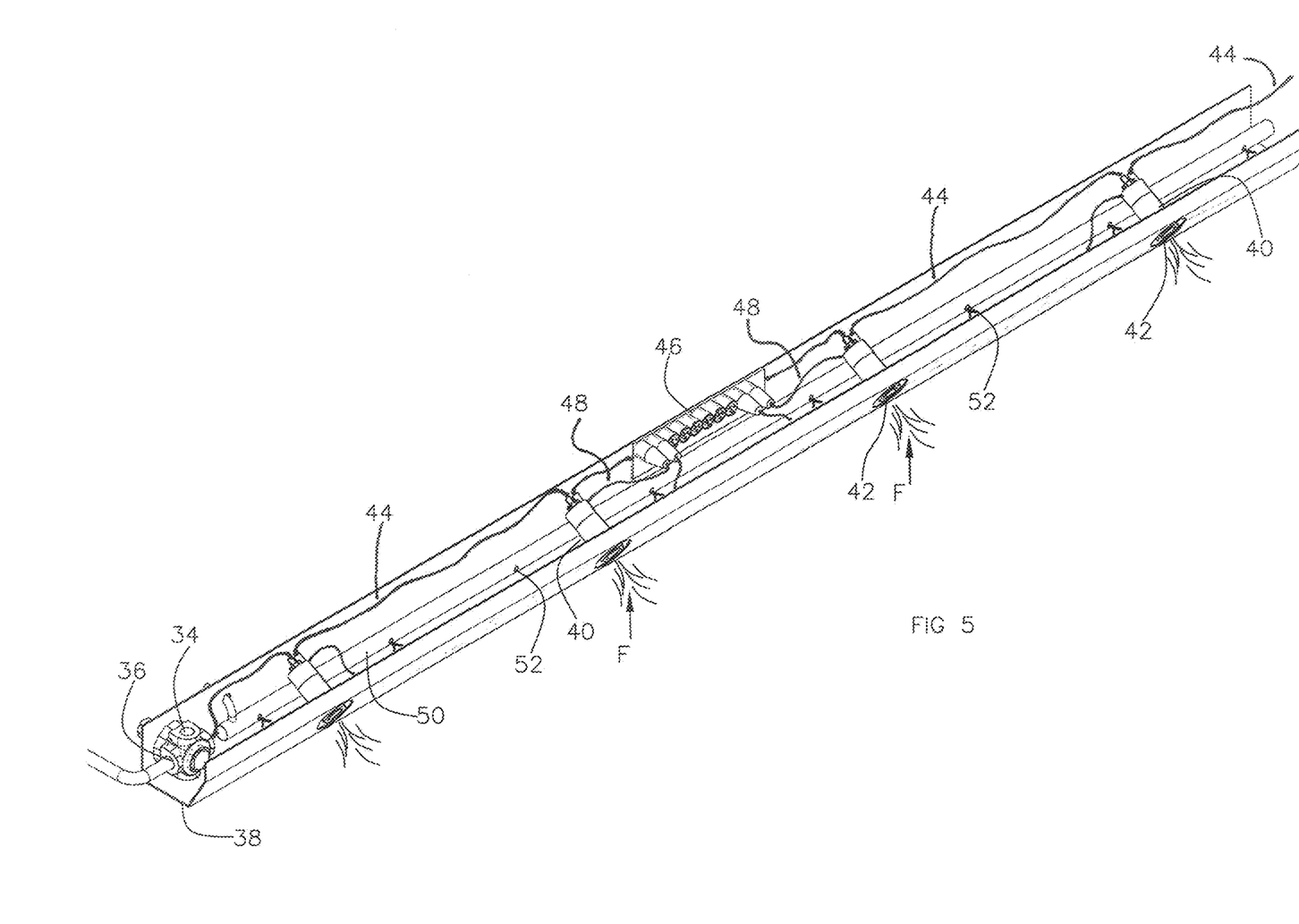
FIG. 5 is a detailed view of a nozzle housing of the display case of FIG. 1 to which piezoelectric transducer atomizer nozzles are mounted.

A nozzle housing 38, see also FIG. 5, is located on an underside of the case top wall 26. A plurality of piezoelectric transducer nebulizers 40 are mounted in spaced apart relationship in the housing 38 and emit the dry fog F through openings 42. In the illustrated embodiment, the spacing is about one foot. The nebulizers 40 are fluidically connected in series, using tubes 44, to an output of the pressure regulator 34. Each of the nebulizers 40 is electrically connected to a connector board 46 via cables 48. An ozone mist bar 50 having openings 52 may also be housed in the nozzle housing.

A control box 54 is mounted to the top wall 26. An ozone generator 55 may also be mounted on the top wall 26. The control box 54 houses a control system 56, see FIG. 6, for controlling the preservation system 28. The control system 56 has a 12Vdc power supply 58 that is connected to a convention 120Vac source 60. The power supply 58 supplies its output via a block connector 62 to a timer 64, the control valve 32, and a nebulizer controller 66. The timer 64 is connected to the control valve 32 and to the controller 66. The controller 66 is connected to the connector board 46.

Figure 6:
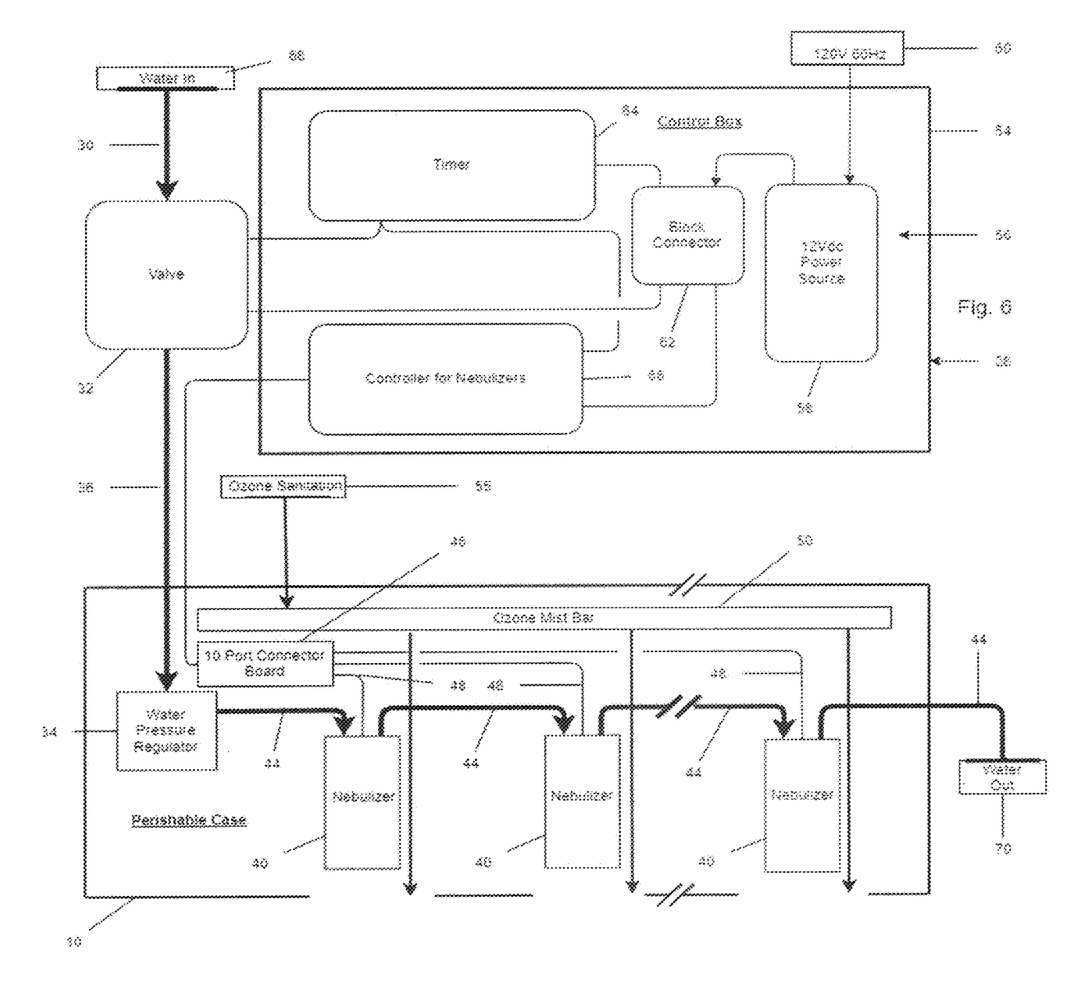
FIG. 6 is a block diagram of the preservation system.

The pressurized water supply to the tube 36 is from a water in source 68. Typical water pressure tends to range between 45 and 80 psi. The pressure regulator 34 is set to reduce water pressure to a relatively low range of 0.5-2 psi, and advantageously to about 1-1.5 psi. The tube 44 from the last of the nebulizers 40 terminates in a drain 70.

The timer 64 is configured to alternately generate an on signal and an off signal to the control valve 32 and to the controller 66. Particularly, the timer 64 periodically controls the valve 32 to supply water to the pressure regulator 34 and to enable the controller 66 whereby the nebulizers 40 emit the dry fog F to maintain desired relative humidity level throughout the display case.

In an exemplary embodiment of the invention, the nebulizers 40 comprise M05 or M08 spray heads from Tekceleo. The controller 66 comprises an Electronic Control Unit (ECU) of Tekceleo. The controller 66 develops a pulse width modulated (PWM) control signal to drive the nebulizers 40. Duty cycle of the PWM signal can be user selected. In an exemplary embodiment of the invention, the duty cycle is set to 100%. A lower duty cycle may also be used, as desired. The controller 66 feeds the correct voltage, current and on-off pulses to cause the piezoelectric transducer in the atomizer nozzles of the nebulizers 40 to vibrate at the correct frequencies.

The controller 66 is configured to control the nebulizers 40 to emit particles in the 0.1 to 10 micron range to maintain desired relative humidity level of about 75% to 99.9% RH throughout the display case 10.

The exemplary preservation system can include up to eight nebulizers 40. As is apparent, a different quantity may be used, as necessary or desired.

For a produce case application, eight nebulizers 40 are placed in series in a row in a preservation system 28. With this maximum eight nebulizers, the system will operate properly. A nebulizer 40 will be mounted every lineal foot of case. If there is a need to cover more than eight lineal feet, then additional systems 28 may be used.

For meat/seafood service case applications, as many nebulizers as required to fill the case with dry fog will be used. If the case requires more than eight nebulizers to fill with fog, then multiple systems 28 will be used.

For cheese display cases, the number of nozzles may be a function of desired appearance with a rolling fog over the cheese to attract shoppers. The preservation system 28 will keep cheese fresh if unwrapped. Here again, up to eight nebulizers 40 maximum will be driven by the water pressure.

The preservation system 28 may also be used in display cases such as humidors and deli cases. These cases are for perishable products that do not use cold temperature refrigeration equipment.

Thus, there is disclosed herein the preservation system 28 for emitting a dry fog F to preserve perishable products in a display case 10 comprising a control device, such as a control valve 32, selectively actuated to provide a pressurized water supply 68. A pressure regulator 34 is connected to the control device 32 for reducing water pressure to a range of 0.5-2 psi. A plurality of piezoelectric transducer atomizer nozzles 40 are operatively mounted in spaced apart relationship in the display case 10 and are fluidically connected in series with an output of the pressure regulator 34 to emit the dry fog in the display case 10. The control system 56 comprises a controller 66 for controlling a duty cycle of a pulse signal to vibrate the piezoelectric transducers in the plurality of atomizer nozzles 40, and a timer 64 for alternately generating an on signal and an off signal to periodically control the control device 32 to supply water to the pressure regulator 34 and to enable the controller 66 whereby the atomizer nozzles 40 emit the dry fog to maintain desired relative humidity level throughout the display case 10.

It will be appreciated by those skilled in the art that there are many possible modifications to be made to the specific forms of the features and components of the disclosed embodiments while keeping within the spirit of the concepts disclosed herein. Accordingly, no limitations to the specific forms of the embodiments disclosed herein should be read into the claims unless expressly recited in the claims. Although a few embodiments have been described in detail above, other modifications are possible. Other embodiments may be within the scope of the following claims.

The foregoing disclosure of specific embodiments is intended to be illustrative of the broad concepts comprehended by the invention.

The invention claimed is:

1. A preservation system for perishable products in a display case, comprising:
    a control valve for connection to a pressurized water supply;
    a pressure regulator connected to the control valve for reducing water pressure in a range of 0.5-2 psi;
    a plurality of nebulizers, each comprising a piezoelectric transducer, operatively mounted in a product zone of the display case in spaced apart relation to one another and fluidically connected in series with an output of the pressure regulator to emit a dry fog in the display case; and
    a control system comprising a controller for controlling a duty cycle of a pulse signal to vibrate the piezoelectric transducers in the plurality of nebulizers, and a timer for alternately generating an on signal and an off signal to periodically control the valve to supply water to the pressure regulator and to enable the controller whereby when the controller is enabled by the timer the nebulizers emit the dry fog in accordance with the duty cycle of the pulse signal to maintain relative humidity level throughout the display case.

2. The preservation system of claim 1 wherein the pressure regulator connected to the control valve for reducing water pressure in a range of 1-1.5 psi.

3. The preservation system of claim 1 wherein the plurality of nebulizers comprises up to eight nebulizers.

4. The preservation system of claim 1 wherein the nebulizers are spaced one foot apart in the display case.

5. The preservation system of claim 1 wherein the display case comprises a produce case.

6. The preservation system of claim 1 wherein the display case comprises a meat or seafood service case.

7. The preservation system of claim 1 wherein the display case comprises a cheese display case.

8. The preservation system of claim 1 further comprising an ozone generating system operatively mounted to the display case.

9. The preservation system of claim 1 wherein the controller controls the piezoelectric transducers to operate at 100% duty cycle.

10. The preservation system of claim 1 wherein the controller is configured to control the nebulizers to emit particles in the 0.1 to 10 micron range to maintain relative humidity level throughout the display case.

11. A preservation system for emitting a dry fog to preserve perishable products in a display case, comprising:
    a control device selectively actuated to provide a pressurized water supply;
    a pressure regulator connected to the control device for reducing water pressure to a range of 0.5-2 psi;
    a plurality of atomizer nozzles, each comprising a piezoelectric transducer, operatively mounted in spaced apart relationship in a product zone of the display case and fluidically connected in series with an output of the pressure regulator to emit a dry fog in the display case; and
    a control system comprising a controller for controlling a duty cycle of a pulse signal to vibrate the piezoelectric transducers in the plurality of atomizer nozzles, and a timer for alternately generating an on signal and an off signal to periodically control the control device to supply water to the pressure regulator and to enable the controller whereby when the controller is enabled by the timer the atomizer nozzles emit the dry fog in accordance with the duty cycle of the pulse signal to maintain relative humidity level throughout the display case.

12. The preservation system of claim 11 wherein the pressure regulator connected to the control device for reducing water pressure in a range of 1-1.5 psi.

13. The preservation system of claim 11 wherein the plurality of atomizer nozzles comprises up to eight atomizer nozzles.

14. The preservation system of claim 11 wherein the atomizer nozzles are spaced one foot apart in the display case.

15. The preservation system of claim 11 wherein the display case comprises a produce case.

16. The preservation system of claim 11 wherein the display case comprises a meat or seafood service case.

17. The preservation system of claim 11 wherein the display case comprises a cheese display case.

18. The preservation system of claim 11 further comprising an ozone generating system operatively mounted to the display case.

19. The preservation system of claim 11 wherein the controller controls the piezoelectric transducers to operate at 100% duty cycle.

20. The preservation system of claim 11 wherein the controller is configured to control the atomizer nozzles to emit particles in the 0.1 to 10 micron range to maintain relative humidity level throughout the display case.

* * * * *